US011237065B2

(12) United States Patent
Zanbaghi et al.

(10) Patent No.: US 11,237,065 B2
(45) Date of Patent: Feb. 1, 2022

(54) HIGH DYNAMIC RANGE TEMPERATURE SENSOR

(71) Applicant: Cirrus Logic International Semiconductor Ltd., Edinburgh (GB)

(72) Inventors: Ramin Zanbaghi, Austin, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 423 days.

(21) Appl. No.: 16/385,616

(22) Filed: Apr. 16, 2019

(65) Prior Publication Data

US 2020/0333196 A1 Oct. 22, 2020

(51) Int. Cl.
*G01K 7/00* (2006.01)
*G01K 7/34* (2006.01)
*G01K 7/01* (2006.01)

(52) U.S. Cl.
CPC .......... *G01K 7/34* (2013.01); *G01K 7/01* (2013.01); *G01K 2217/00* (2013.01); *G01K 2219/00* (2013.01)

(58) Field of Classification Search
USPC ........................ 374/184, 170, 173
See application file for complete search history.

(56) References Cited

U.S. PATENT DOCUMENTS

| 2006/0039445 | A1* | 2/2006 | McLeod ............. | G01K 7/01 374/178 |
| 2006/0193370 | A1* | 8/2006 | St. Pierre .......... | G01K 7/01 374/178 |
| 2007/0091979 | A1* | 4/2007 | Chiu ................. | G01K 7/01 374/1 |
| 2010/0103979 | A1* | 4/2010 | Anzai ............... | G01K 7/01 374/173 |

(Continued)

OTHER PUBLICATIONS

Aita, André L. et al. "Low-Power CMOS Smart Temperature Sensor With a Batch-Calibrated Inaccuracy of ±0.25° C. (±3σ) from −70° C. to 130° C." IEEE Sensors Journal, vol. 13, No. 5, May 2013. pp. 1840-1848.

(Continued)

*Primary Examiner* — Mirellys Jagan
(74) *Attorney, Agent, or Firm* — E. Alan Davis; James W. Huffman

(57) ABSTRACT

A temperature sensor having a two-state input current, an element whose temperature is sensed based on a change in voltage across the element induced by the two states of the input current, a charge-to-digital converter, and a capacitor continuously connected between the element and the charge-to-digital converter. The capacitor experiences a charge difference due to the change in voltage across the element induced by the two states of the input current, and the charge-to-digital converter converts the charge difference to a digital value indicative of the temperature of the element. A two-state DC-shifting current having opposite polarity of (Continued)

the two-state input current, a pull-down resistor whose voltage varies with the two-states of the DC-shifting current, and a second capacitor continuously connected between the pull-down resistor and the charge-to-digital converter operate to shift down a DC operating point of the charge-to-voltage converter to increase its dynamic range.

21 Claims, 4 Drawing Sheets

(56) References Cited

U.S. PATENT DOCUMENTS

2010/0161261 A1* 6/2010 Drapkin .................. G01K 7/01
702/65
2018/0328792 A1* 11/2018 Zhu .......................... G01K 7/34

OTHER PUBLICATIONS

Pu, Xiao et al. "A ±0.4° C. Accurate High-Speed Remote Junction Temperature Sensor with Digital Beta Correction and Series-Resistance Cancellation in 65nm CMOS." 2013 Symposium on VLSI Circuits, Kyoto, 2013. pp. C214-C215.

* cited by examiner

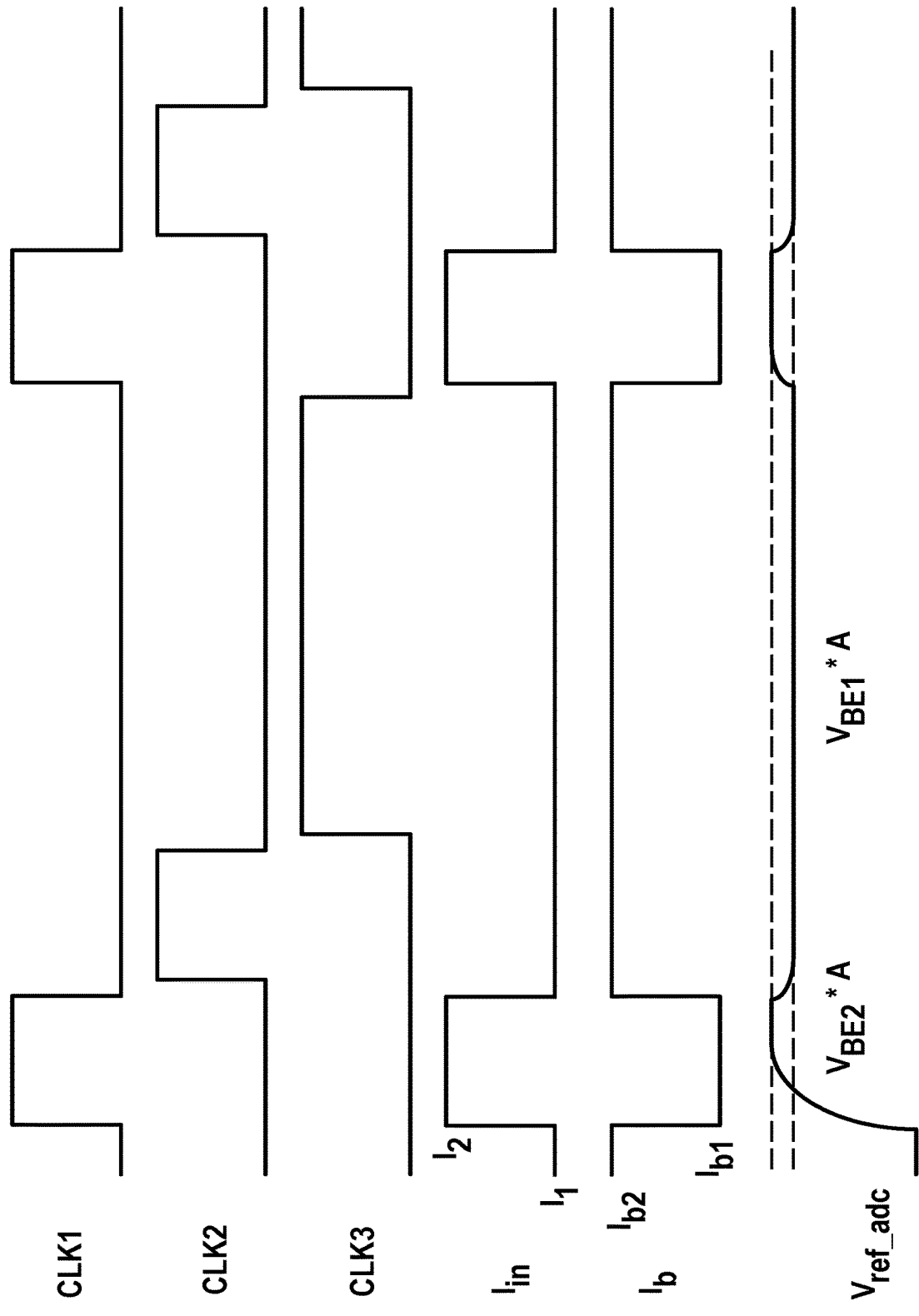

HIGH DYNAMIC RANGE TEMPERATURE SENSOR

BACKGROUND

Temperature sensors are used to measure temperature in electronic devices, such as integrated circuits, and may be used for various purposes such as to detect and protect devices from potentially damaging high temperatures and for compensating for temperature variations to provide more accurate results.

FIG. 1 illustrates a prior art temperature sensor described in the paper by A. Aita, entitled "Low-Power CMOS Smart Temperature Sensor With a Batch-Calibrated Inaccuracy of ±0.25° C. (±3σ) from −70° C. to 130° C.," IEEE Sensors Journal, Vol. 13, No. 5, May 2013 (hereafter "the Aita Paper"), which is hereby incorporated by reference for all purposes. The sensor includes a first source current $I_1$ that is a proportional to absolute temperature (PTAT) current $I_{PTAT}$, and a second source current $I_2$, where $I_2 = N*I_{PTAT}$. Current $I_1$ is passed through a PNP bipolar junction transistor (BJT) $Q_1$ to generate a base-emitter voltage $V_{BE1}$, and current $I_2$ is passed through another PNP BJT transistor $Q_2$ to generate a base-emitter voltage $V_{BE2}$. The bases of $Q_1$ and $Q_2$ are coupled together. The areas of the two transistors are equal, i.e., $A_{Q1} = A_{Q2}$. The difference of $V_{BE1}$ and $V_{BE2}$ is referred to as $\Delta V_{BE}$ which may be used to determine temperature of the transistors. The value of $V_{BE}$ is given by $$V_{BE} = V_T * \ln\left(\frac{I_C}{I_S} + 1\right),$$

and the value of $\Delta V_{BE}$ is given by $\Delta V_{BE} = V_T * \ln(N)$, where $V_T$ is the thermal voltage, $I_C$ is collector current, and $I_S$ is the saturation current of the relevant transistor ($Q_1$ or $Q_2$). $V_{BE1}$, $V_{BE2}$ and $\Delta V_{BE}$ are sampled by a delta-sigma analog-to-digital converter (ADC) shown in FIG. 1 that includes an integrating stage and a quantizer with the rest of the loop filter in between them. Voltages $V_{BE1}$, $V_{BE2}$ and $\Delta V_{BE}$ are sampled by the ADC through switched capacitors $C_s$ that operate as resistors. The ADC generates a digital output $D_{out}$. The ADC output $D_{out}$, $V_{BE}$ and $\Delta V_{BE}$ satisfy the relation: $\text{Mean}\{D_{out}*(-V_{BE}) + \overline{D_{out}}*\Delta V_{BE}\} = 0$. Temperature information is provided by the average value of the ADC bit stream output $D_{out}$ according to the relations $\text{Mean}\{D_{out}\} \mu \Rightarrow \mu*(-V_{BE}) + (1-\mu)*\Delta V_{BE} = 0$, where $$\mu = \frac{\Delta V_{BE}}{V_{REF}},$$

where $V_{REF}$ is a reference voltage used by the ADC.

A disadvantage of the sensor of FIG. 1 is that it requires two PNP transistors and requires that they be well-matched in order to achieve good temperature measurement. Another disadvantage is that it requires differential sampling of input voltages. Another disadvantage is that it requires a significant number of switches and capacitors.

FIG. 2 illustrates a second prior art temperature sensor described in the paper by X. Pu, entitled "A ±0.4° C. Accurate High-Speed Remote Junction Temperature Sensor with Digital Beta Correction and Series-Resistance Cancellation in 65 nm CMOS," 2013 Symposium on VLSI Circuits, Kyoto, 2013, pp. C214-C215 (hereafter "the Pu Paper"), which is hereby incorporated by reference for all purposes. The sensor of FIG. 2 is similar in many respects to the sensor of FIG. 1. However, the PTAT currents $I_1$ and $I_2$ of FIG. 2 go through the same PNP BJT transistor Q in a switched fashion. This configuration alleviates the need for transistor matching since there is only one transistor. Another advantage is that fully differential ADC sampling is not required. However, the sensor of FIG. 2 has the disadvantage that it requires an external reference voltage, which is a zero-temperature coefficient (ZTC) reference voltage. Another disadvantage is that it requires a significant number of switches, and the switching of the switched capacitors may introduce switching thermal noise and kick and settling effects on the transistor Q, as may the switched capacitors of the sensor of FIG. 1.

SUMMARY

In one embodiment, the present disclosure provides a temperature sensor having a two-state input current, an element whose temperature is sensed based on a change in voltage across the element induced by the two states of the input current, a charge-to-digital converter, and a capacitor continuously connected between the element and the charge-to-digital converter. The capacitor experiences a charge difference due to the change in voltage across the element induced by the two states of the input current, and the charge-to-digital converter converts the charge difference to a digital value indicative of the temperature of the element.

In another embodiment, the present disclosure provides a method that includes forcing a two-state input current into an element whose temperature is sensed based on a change in voltage across the element induced by the two states of the input current and using a capacitor to maintain a continuous connection between the element and a charge-to-digital converter. The capacitor experiences a charge difference due to the change in voltage across the element induced by the two states of the input current. The method further includes converting, by the charge-to-digital converter, the charge difference to a digital value indicative of the temperature of the element.

In yet another embodiment, the present disclosure provides a non-transitory computer-readable medium having instructions stored thereon that are capable of causing or configuring a temperature sensor to perform operations that include forcing a two-state input current into an element whose temperature is sensed based on a change in voltage across the element induced by the two states of the input current and using a capacitor to maintain a continuous connection between the element and a charge-to-digital converter. The capacitor experiences a charge difference due to the change in voltage across the element induced by the two states of the input current. The operations further include converting, by the charge-to-digital converter, the charge difference to a digital value indicative of the temperature of the element.

BRIEF DESCRIPTION OF THE DRAWINGS

FIG. 4 is a timing diagram illustrating operation of the sensor of FIG. 3 in accordance with embodiments of the present disclosure.

DETAILED DESCRIPTION

Embodiments of a temperature sensor that provides high temperature detection accuracy with low noise and higher signal level, very low process sensitivity, and very low power consumption are described.

Figure 1:
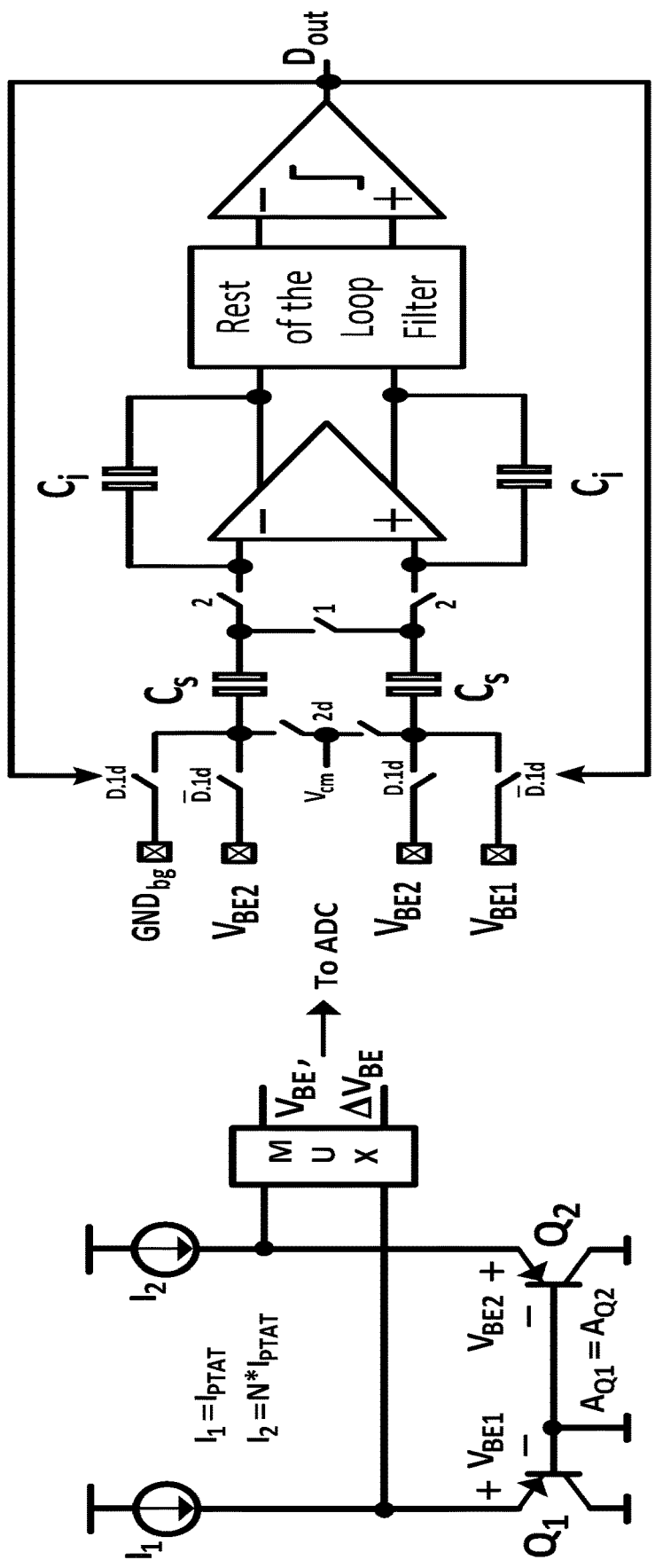
FIGS. 1 and 2 are circuit diagrams of prior art temperature sensors.
Figure 2:
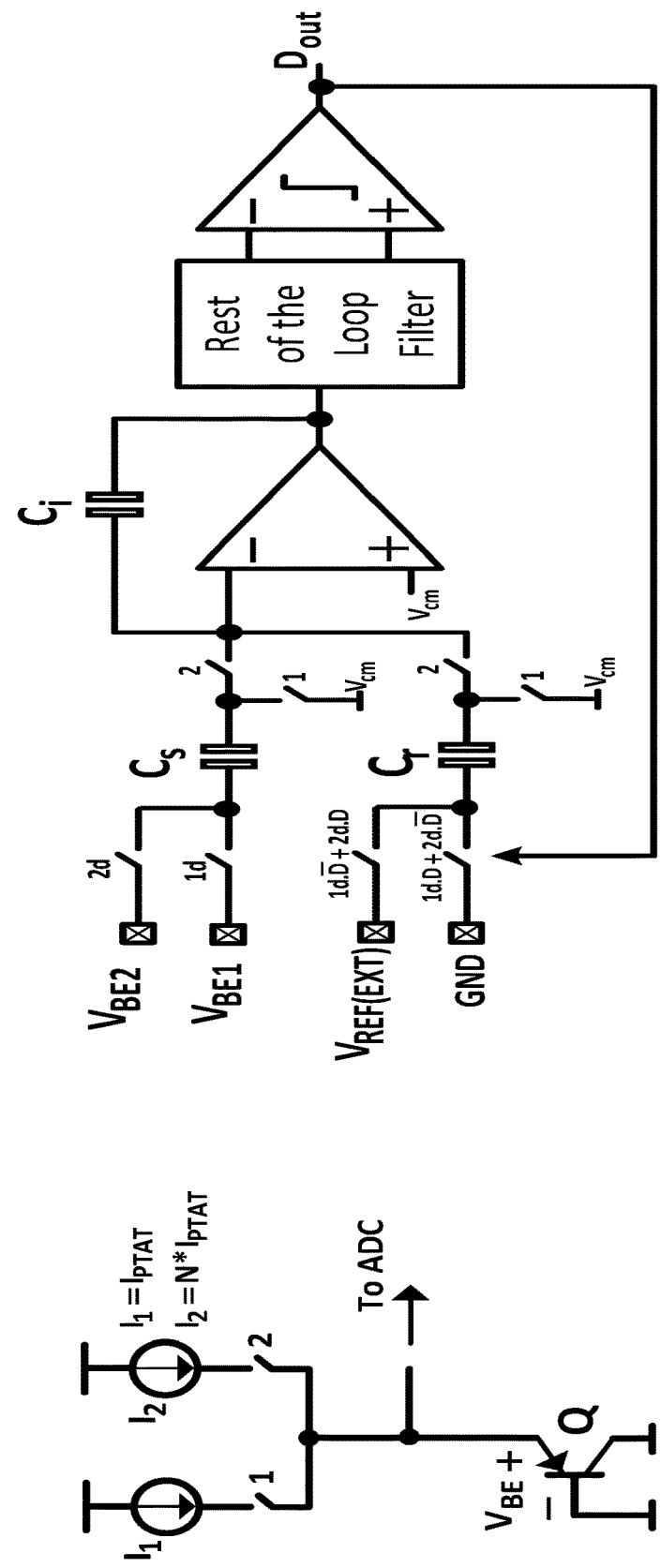
Figure 3:
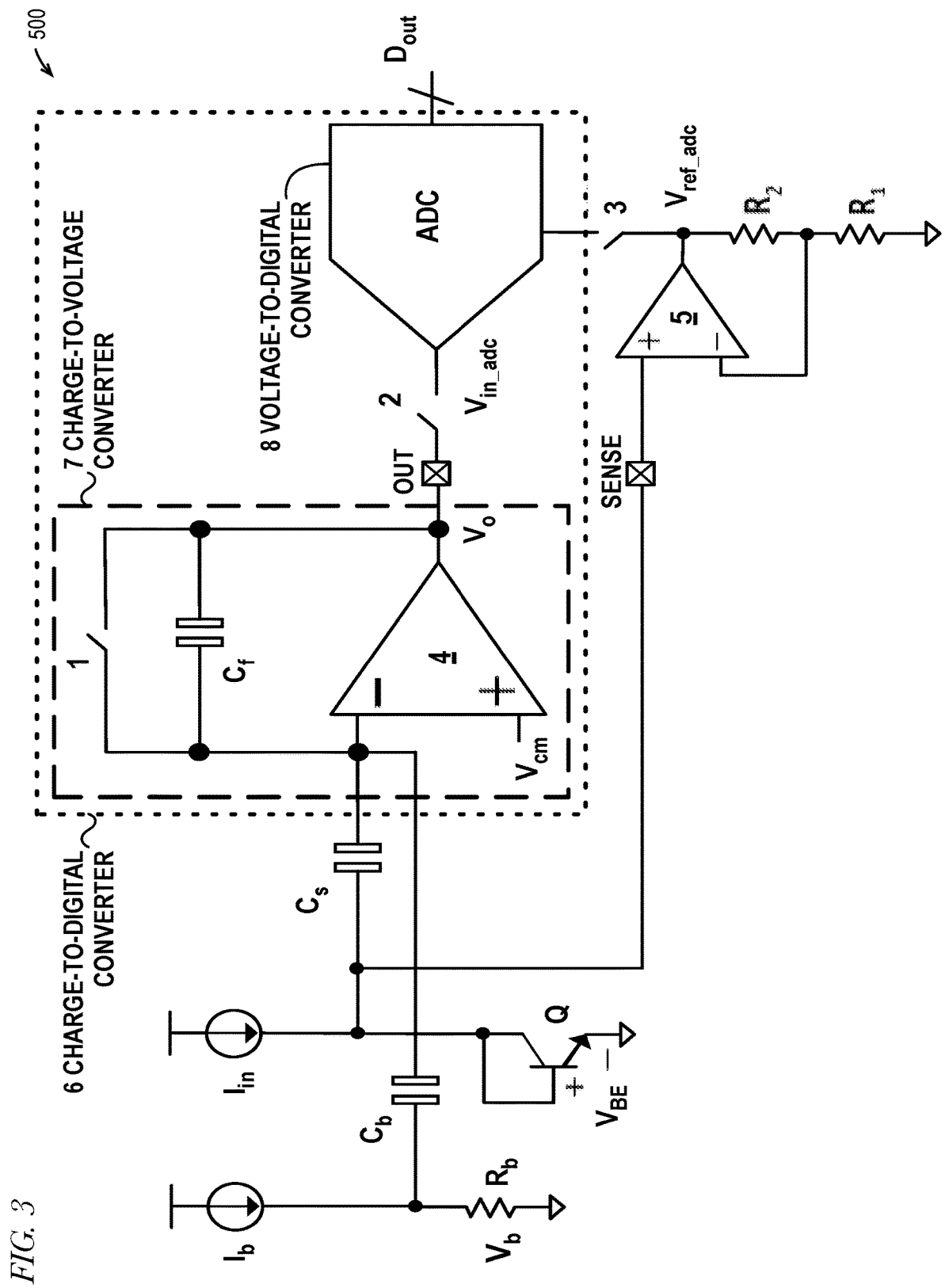
FIG. 3 is a circuit diagram illustrating a temperature sensor in accordance with embodiments of the present disclosure.

FIG. 3 is a circuit diagram illustrating a temperature sensor 500 in accordance with embodiments of the present disclosure. Sensor 500 is a continuous capacitive gain stage-based temperature sensor without sampling switches. In one embodiment, the temperature sensor is a PTAT sensor. In an alternate embodiment, the temperature sensor is a NTAT sensor. The temperature sensor 500 includes a gain stage 4, a reference stage 5, an analog-to-digital converter (ADC) (also referred to in FIG. 3 as voltage-to-digital converter 8), a first high-low state (two-state) current source $I_b$ coupled to a power source, a second high-low state (two-state) current source $I_{in}$ coupled to the power source, an NPN bipolar junction transistor (BJT) Q, a capacitor $C_s$, a capacitor $C_b$, a feedback capacitor $C_f$, a pull-down resistor $R_b$, series resistors $R_1$ and $R_2$, a switch 1, a switch 2, a switch 3, a pin OUT at the output of gain stage 4, and a pin SENSE coupled to the non-inverting input of reference stage 5.

Transistor Q is diode-connected, i.e., its base and collector are coupled together. The collector of transistor Q is coupled to the output of two-state current source $I_{in}$ and to pin SENSE. Two-state input current $I_{in}$ is pumped into the base and collector of transistor Q. The two states of input current $I_{in}$ are a high state current $I_2$ and a low state current $I_1$ (see FIG. 4). Transistor Q converts the two-state input current $I_{in}$ into a base-emitter voltage $V_{BE}$. More specifically, the voltage generated by transistor Q in response to high state current $I_2$ is referred to as voltage $V_{BE2}$, and the voltage generated by transistor Q in response to low state current $I_1$ is referred to as voltage $V_{BE1}$. Transistor Q is an element whose temperature may be sensed based on a change in its base-emitter voltage $V_{BE}$ induced by the two different states of the input current $I_{in}$, e.g., a change from low current state $I_1$ to high current state $I_2$. Other embodiments use a different type of element, e.g., a resistor with a temperature-varying resistance whose temperature may be sensed based on a temperature-dependent change in voltage across it induced by the two different states of the input current $I_{in}$.

Capacitor $C_s$ is continuously connected between the base/collector of transistor Q and the inverting input of gain stage 4. That is, capacitor $C_s$ is not switched. The non-inverting input to gain stage 4 receives a common mode input voltage $V_{cm}$. The inverting input to gain stage 4 is maintained at the same voltage $V_{cm}$ by virtual ground effect of feedback around the gain stage. The charge $Q_{Cs}$ on capacitor $C_s$ is given by the relationship $Q_{Cs}=C_s*(V_{BE}-V_{cm})$, where $C_s$ is the capacitance of capacitor $C_s$. In this sense, capacitor $C_s$ samples voltage $V_{BE}$. Stated alternatively, capacitor $C_s$ converts base-emitter voltage $V_{BE}$ into an input charge.

Pull-down resistor $R_b$ is coupled between the output of two-state current source $I_b$ and ground. Two-state current $I_b$ is pumped into pull-down resistor $R_b$. The two states of current $I_b$ are a high state current $I_{b2}$ and a low state current $I_{b1}$ (see FIG. 4). Resistor $R_b$ generates a voltage $V_b$. More specifically, the voltage generated by resistor $R_b$ in response to high state current $I_{b2}$ is referred to as voltage $V_{b2}$, and the voltage generated by resistor $R_b$ in response to low state current $I_{b1}$ is referred to as voltage $V_{b1}$ (see equations (2) through (6) below). Capacitor $C_b$ is continuously connected between the non-ground terminal of pull-down resistor $R_b$ and the inverting input of gain stage 4. That is, capacitor $C_b$ is not switched. The charge $Q_{Cb}$ on capacitor $C_b$ is given by the relationship $Q_{Cb}=C_b*(V_b-V_{cm})$, where $C_b$ is the capacitance of capacitor $C_b$. In this sense, capacitor $C_b$ samples voltage $V_b$. Stated alternatively, capacitor $C_b$ converts voltage $V_b$ into an input charge. Two-state current source $I_b$, pull-down resistor $R_b$, and capacitor $C_b$ operate as a continuous DC shifting branch to shift the DC operating point and maximize signal dynamic range at the output of gain stage 4. Operation of the continuous DC shifting branch is described in more detail below with respect to FIG. 4.

Feedback capacitor $C_f$ is coupled between the inverting input and the output of gain stage 4. Feedback capacitor $C_f$ gains up the input charge generated by conversion of voltage $V_{BE}$ by capacitor $C_s$. Feedback capacitor $C_f$ also gains up the input charge generated by conversion of voltage $V_b$ by capacitor $C_b$. Switch 1 is coupled across feedback capacitor Cf. The charge $Q_{Cf}$ on capacitor $C_f$ when switch 1 is open is given by the relationship $Q_{Cf}=C_f*V_o$, where $C_f$ is the capacitance of capacitor $C_f$. When switch 1 is closed, the voltage across capacitor $C_f$ is zero and there is no charge on capacitor $C_f$.

Stage 5 generates a reference voltage $V_{ref\_adc}$ on its output. The ADC receives the reference voltage $V_{ref\_adc}$ when switch 3 is closed enabling the ADC to convert the analog output voltage $V_o$ to a digital value. Resistor $R_2$ is coupled between the output of stage 5 and a node to which resistor $R_1$ and the inverting input of stage 5 are coupled. The other terminal of resistor $R_1$ is coupled to ground. Thus, when switch 3 is closed, $V_{ref\_adc}$ is a scaled version of voltage $V_{BE}$ for use by the ADC in converting analog input voltage $V_{in\_adc}$ to digital output $D_{out}$.

Gain stage 4 generates an analog output voltage $V_o$ that is provided to switch 2. When switch 2 is closed, the output voltage $V_o$ is provided as an input voltage $V_{in\_adc}$ to the input of the ADC for sampling. The ADC converts the analog input voltage $V_{in\_adc}$ to a digital value $D_{out}$.

The average value of the bit stream output $D_{out}$ of the ADC provides temperature information of the transistor Q, as indicated by equation (1)

$$\mu = \text{Mean}\{D_{out}\} = G*\left(\frac{\Delta V_{BE}}{V_{BE2}}\right), G = \frac{C_S}{C_F}, \Delta V_{BE} = V_{BE2} - V_{BE1} \quad (1)$$

where $V_{BE1}$ is the value of voltage $V_{BE}$ when two-state input current $I_{in}$ is the low state current $I_1$ and $V_{BE2}$ is the value of voltage $V_{BE}$ when two-state input current $I_{in}$ is the high state current $I_2$.

Gain stage 4, feedback capacitor $C_f$, and switch 1 are an embodiment of a charge-to-voltage converter 7 that converts a change in the charge on capacitor $C_s$ ($\Delta Q_{Cs}$) between the two states of the input current $I_{in}$ to a voltage $V_o$, which is indicative of the temperature of element transistor Q, as described in more detail below. The input charge to gain stage 4 is generated by capacitor $C_s$ and capacitor $C_b$, as described above. Together, charge-to-voltage converter 7 and the ADC operate as a charge-to-digital converter 6. Because capacitor $C_s$ is not switched but is instead continuously connected between the element whose temperature may vary (e.g., transistor Q) and charge-to-digital converter 6, it provides an alternating current AC-coupled path between them, rather than a DC path that would be present if the capacitor were used as a switched-capacitor resistor, for example. By changing the state of the input current $I_{in}$, the value of voltage $V_{BE}$ changes accordingly, and such an alternating value couples through capacitor $C_s$. Furthermore, the voltage difference $\Delta V_{BE}$, or change of voltage $V_{BE}$, between the two states may be considered a DC value that is obtained by operation of the switching in the current domain. Advantages of the embodiment over a switched-capacitor solution (e.g., the Pu Paper) include but are not limited to removal of switching thermal noise and avoidance of kick and settling effects on the element (e.g., transistor Q).

FIG. 4 is a timing diagram illustrating operation of the sensor 500 of FIG. 3 in accordance with embodiments of the present disclosure. The timing diagram illustrates operation of switch 1, switch 2, and switch 3 over a clock cycle. The clock signals that control switches 1, 2, and 3 are shown as signals CLK1, CLK2, and CLK3, respectively, with a high value indicating a closed switch and a low value indicating an open switch. The timing diagram also illustrates the states of two-state current sources $I_{in}$ and $I_b$ and voltage $V_{ref\_adc}$ over the clock cycle. In one embodiment, current $I_b$ has opposite polarity to current $I_{in}$.

At the beginning of a first phase of the clock cycle: switch 1 closes which bypasses feedback capacitor $C_f$ and makes gain stage 4 a unity-gain stage; switch 2 remains open since it is not yet time for the ADC to sample the output of gain stage 4; switch 3 remains open since it is not yet time for the ADC to convert the input voltage $V_{in\_adc}$; current $I_{in}$ transitions from low state $I_1$ to high state $I_2$; and current $I_b$ transitions from high state $I_{b2}$ to a low state $I_{b1}$. The increase of current $I_{in}$ from the low state $I_1$ to the high state $I_2$ causes the voltage $V_{BE}$ to increase to voltage value $V_{BE2}$, which charges capacitor $C_s$ with a charge value $Q_{C_s CLK1}$, and which causes reference voltage $V_{ref\_adc}$ to rise as shown. In FIG. 4, the level of $V_{ref\_adc}$ while high state current $I_2$ is pumped into transistor Q is shown as $V_{BE2}$*A, where A is the scaling factor applied to voltage $V_{BE}$ by stage 5 and resistors R1 and R2 to generate $V_{ref\_adc}$. The reduction of current $I_b$ to the low state $I_{b1}$ causes voltage $V_b$ to decrease to a voltage referred to as $V_{b1}$, which charges capacitor $C_b$ with a charge value $Q_{C_b CLK1}$.

At the beginning of a second phase of the clock cycle (e.g., approximately twenty percent into the clock cycle), which may be referred to as the ADC sampling phase: switch 1 opens which allows charge stored on capacitors $C_s$ and $C_b$ to transfer to capacitor $C_f$; switch 2 closes enabling the ADC to sample its input voltage $V_{in\_adc}$ (i.e., the output voltage $V_o$ of gain stage 4), switch 3 remains open, current $I_{in}$ transitions from high state $I_2$ to low state $I_1$, and current $I_b$ transitions from low state $I_{b1}$ to high state $I_{b2}$. The decrease of current $I_{in}$ from the high state $I_2$ to the low state $I_1$ causes the voltage $V_{BE}$ to decrease from voltage value $V_{BE2}$ to voltage value $V_{BE1}$, which charges capacitor $C_s$ with a charge value $Q_{C_s CLK2}$ that is less than charge value $Q_{C_s CLK1}$, and which causes reference voltage $V_{ref\_adc}$ to drop as shown. In FIG. 4, the level of $V_{ref\_adc}$ while low state current $I_1$ is pumped into transistor Q is shown as $V_{BE1}$*A. The increase of current $I_b$ to the high state $I_{b2}$ causes voltage $V_b$ to increase to voltage $V_{b2}$, which charges capacitor $C_b$ with a charge value $Q_{C_b CLK2}$ which is greater than charge value $Q_{C_b CLK1}$.

At the beginning of a third phase of the clock cycle (e.g., approximately forty percent into the clock cycle), which may be referred to as the ADC conversion phase: switch 1 remains open, switch 2 opens, and shortly after switch 3 closes enabling the ADC to receive reference voltage $V_{ref\_adc}$ for use in converting its analog input voltage $V_{in\_adc}$ to digital output $D_{out}$. Near the end of the clock cycle, switch 3 opens.

The change in voltage $\Delta V_b$ has the effect of DC shifting down the output of gain stage 4. The DC down shift may facilitate gain up of $\Delta V_{BE}$. The gain up of $\Delta V_{BE}$ facilitated by the DC down shift may advantageously boost the dynamic range of output voltage $V_o$ of gain stage 4 and thereby increase the accuracy of the temperature output $D_{out}$.

Operation of the sensor 500 may be further understood by reference to equations (2) through (6) which will now be described.

$$CLK1 \begin{cases} Q_{C_s CLK1} = C_s \cdot \{V_{BE2} - (V_{CM} + V_{os})\} \\ Q_{C_b CLK1} = C_b \cdot \{V_{b1} - (V_{CM} + V_{os})\} \\ Q_{C_f CLK1} = C_f \cdot \{(V_{CM} + V_{os}) - 0\} \end{cases} \quad (2)$$

$$CLK2 \begin{cases} Q_{C_s CLK2} = C_s \cdot \{V_{BE1} - (V_{CM} + V_{os})\} \\ Q_{C_b CLK2} = C_b \cdot \{V_{b2} - (V_{CM} + V_{os})\} \\ Q_{C_f CLK2} = C_f \cdot \{(V_{CM} + V_{os}) - V_O\} \end{cases} \quad (3)$$

$$\Delta Q_{C_f} = \Delta Q_{C_s} + \Delta Q_{C_b} \Rightarrow \quad (4)$$

$$C_f \cdot \{((V_{CM} + V_{os}) - V_O) - ((V_{CM} + V_{os}) - 0)\} = \quad (5)$$
$$C_s \cdot \{(V_{BE1} - (V_{CM} + V_{os})) - (V_{BE2} - (V_{CM} + V_{os}))\} + $$
$$C_b \cdot \{(V_{b2} - (V_{CM} + V_{os})) - (V_{b1} - (V_{CM} + V_{os}))\}$$

$$V_O = \frac{c_s}{c_f} \cdot (V_{BE2} - V_{BE1}) - \frac{c_b}{c_f} \cdot (V_{b2} - V_{b1}) = \frac{c_s}{c_f} \cdot \Delta V_{BE} - \frac{c_b}{c_f} \cdot \Delta V_b \quad (6)$$

In equations (2) and (3), CLK1 and CLK2 refer respectively to the first and second phases of the clock cycle of FIG. 4. That is, during CLK1: switch 1 is closed, switch 2 and switch 3 are open, current $I_{in}$ is high at $I_2$, and current $I_b$ is low at $I_{b1}$; during CLK2: switch 1 and switch 3 are open, switch 2 is closed, current $I_{in}$ is low at $I_1$, and current $I_b$ is high at $I_{b2}$. $Q_{C_s CLK1}$, $Q_{C_b CLK1}$, and $Q_{C_f CLK1}$ are the respective charges on capacitors $C_s$, $C_b$, and $C_f$ during CLK1, and $Q_{C_s CLK2}$, $Q_{C_b CLK2}$, and $Q_{C_f CLK2}$ are the respective charges on capacitors $C_s$, $C_b$, and $C_f$ during CLK2. $V_{OS}$ is an input offset voltage to gain stage 4.

Equation (4) describes the charge relationship of capacitors $C_s$, $C_b$ and $C_f$ between CLK1 and CLK2. $\Delta Q_{C_f}$, $\Delta Q_{C_s}$, and $\Delta Q_{C_b}$ are the respective differences in charge on capacitors $C_f$, $C_s$, and $C_b$ from CLK1 to CLK2. Equation (5) further expresses the relationship of equation (4) substituting the values of equations (2) and (3), and equation (6) is the solution of equation (5). As shown in equation (6), the output voltage $V_o$ of gain stage 4 is the change in the voltage $\Delta V_{BE}$ of the element (e.g., transistor Q) multiplied by the gain that is the ratio of $C_s$ to $C_f$, with a DC down shift accomplished by the continuous DC shifting branch, which is the change in the voltage $\Delta V_b$ of the pull-down resistor $R_b$ multiplied by the gain that is the ratio of $C_b$ to $C_f$.

Advantageously, sensor 500 is absent sampling switches. Sensor 500 operates to pass temperature information (e.g., $\Delta V_{BE}$) through capacitor $C_s$ with no switching, and the dynamic DC shifting value $\Delta V_b$ passes through capacitor $C_b$ with no switching, reducing the switching noise and the number of switches over conventional sensors. Furthermore, during the ADC sampling phase, the output $V_o$ of gain stage 4 gets a DC shift down. The DC shift down allows $\Delta V_{BE}$ to be further gained up by $C_s/C_f$. The absence of sampling switches and the further signal gain up advantageously boosts the dynamic range of the output voltage $V_o$. Another advantage of sensor 500 is that it does not require a ZTC reference voltage. Instead, the reference voltage (e.g., $V_{ref\_adc}$) is generated internally. Sensor 500 also advantageously does not require differential sampling. Sensor 500 only requires a single element and does not require matching of elements. Finally, sensor 500 provides high temperature detection accuracy with low noise and higher signal level, very low process sensitivity, and very low power consumption.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A temperature sensor, comprising:
a two-state input current;
an element whose temperature is sensed based on a change in voltage across the element induced by the two states of the input current;
a charge-to-digital converter; and
a capacitor continuously connected between the element and the charge-to-digital converter, wherein the capacitor experiences a charge difference due to the change in voltage across the element induced by the two states of the input current;
wherein the charge-to-digital converter converts the charge difference to a digital value indicative of the temperature of the element; and
wherein the temperature sensor is absent switches connected to the element.

2. The temperature sensor of claim 1,
wherein the element is an element from the list:
a bipolar junction transistor (BJT); and
a resistor.

3. The temperature sensor of claim 1,
wherein the charge-to-digital converter comprises:
a charge-to-voltage converter that converts the charge to a voltage; and
a voltage-to-digital converter that converts the voltage to the digital value.

4. The temperature sensor of claim 3,
wherein the voltage-to-digital converter samples an output of the charge-to-voltage converter and converts the sampled voltage to the digital value.

5. The temperature sensor of claim 3, further comprising:
a two-state direct current (DC)-shifting current that has opposite polarity of the two-state input current;
a pull-down resistor whose voltage varies with the two-states of the DC-shifting current; and
a second capacitor continuously connected between the pull-down resistor and the charge-to-digital converter;
wherein the DC-shifting current, pull-down resistor and second capacitor operate to shift down a DC operating point of the charge-to-voltage converter to increase a dynamic range of the charge-to-voltage converter.

6. The temperature sensor of claim 3,
wherein the charge-to-voltage converter comprises:
an amplifier having an input and an output; and
a feedback capacitor connected between the input and output of the amplifier.

7. The temperature sensor of claim 6, further comprising:
a switch, in parallel with the feedback capacitor, whose state follows the two states of the input current.

8. The temperature sensor of claim 6, further comprising:
a sense node at which the capacitor is connected to the element, wherein the sense node holds a voltage indicative of the temperature of the element; and
wherein the voltage-to-digital converter receives a reference voltage that is a scaled version of the sense node voltage.

9. A method for sensing a temperature, comprising:
forcing a two-state input current into an element whose temperature is sensed based on a change in voltage across the element induced by the two states of the input current;
using a capacitor to maintain a continuous connection between the element and a charge-to-digital converter, wherein the capacitor experiences a charge difference due to the change in voltage across the element induced by the two states of the input current;
converting, by the charge-to-digital converter, the charge difference to a digital value indicative of the temperature of the element; and
operating the temperature sensor without switches connected to the element.

10. The method of claim 9,
wherein the element is an element from the list:
a bipolar junction transistor (BJT); and
a resistor.

11. The method of claim 9,
wherein said converting the charge difference to the digital value comprises:
converting, by a charge-to-voltage converter, the charge to a voltage; and
converting, by a voltage-to-digital converter, the voltage to the digital value.

12. The method of claim 11, further comprising:
sampling, by the voltage-to-digital converter, an output of the charge-to-voltage converter and converting the sampled voltage to the digital value.

13. The method of claim 11, further comprising:
forcing a two-state direct current (DC)-shifting current that has opposite polarity of the two-state input current into a pull-down resistor whose voltage varies with the two-states of the DC-shifting current;
using a second capacitor to maintain a continuous connection between the pull-down resistor and the charge-to-digital converter; and
operating the DC-shifting current, pull-down resistor and second capacitor to shift down a DC operating point of the charge-to-voltage converter to increase a dynamic range of the charge-to-voltage converter.

14. The method of claim 11,
wherein the charge-to-voltage converter comprises:
an amplifier having an input and an output; and
a feedback capacitor connected between the input and output of the amplifier.

15. The method of claim 14, further comprising:
closing a switch that is in parallel with the feedback capacitor during one state of the input current; and
opening the switch during the other state of the input current.

16. The method of claim 14, further comprising:
holding, on a sense node at which the capacitor is connected to the element, a voltage indicative of the temperature of the element; and
receiving, by the voltage-to-digital converter, a reference voltage that is a scaled version of the sense node voltage.

17. A non-transitory computer-readable medium having instructions stored thereon that are capable of causing or configuring a temperature sensor to perform operations comprising:
forcing a two-state input current into an element whose temperature is sensed based on a change in voltage across the element induced by the two states of the input current;
using a capacitor to maintain a continuous connection between the element and a charge-to-digital converter, wherein the capacitor experiences a charge difference due to the change in voltage across the element induced by the two states of the input current;
converting, by the charge-to-digital converter, the charge difference to a digital value indicative of the temperature of the element; and
operating the temperature sensor without switches connected to the element.

18. The non-transitory computer-readable medium of claim 17,
wherein said converting the charge difference to the digital value comprises:
converting, by a charge-to-voltage converter, the charge to a voltage; and
converting, by a voltage-to-digital converter, the voltage to the digital value.

19. A temperature sensor, comprising:
a two-state input current;
an element whose temperature is sensed based on a change in voltage across the element induced by the two states of the input current;
a charge-to-digital converter;
a capacitor continuously connected between the element and the charge-to-digital converter, wherein the capacitor experiences a charge difference due to the change in voltage across the element induced by the two states of the input current;
wherein the charge-to-digital converter converts the charge difference to a digital value indicative of the temperature of the element; and
wherein the charge-to-digital converter comprises:
a charge-to-voltage converter that converts the charge to a voltage; and
a voltage-to-digital converter that converts the voltage to the digital value;
a two-state direct current (DC)-shifting current that has opposite polarity of the two-state input current;
a pull-down resistor whose voltage varies with the two-states of the DC-shifting current; and
a second capacitor continuously connected between the pull-down resistor and the charge-to-digital converter;
wherein the DC-shifting current, pull-down resistor and second capacitor operate to shift down a DC operating point of the charge-to-voltage converter to increase a dynamic range of the charge-to-voltage converter.

20. A method for sensing a temperature, comprising:
forcing a two-state input current into an element whose temperature is sensed based on a change in voltage across the element induced by the two states of the input current;
using a capacitor to maintain a continuous connection between the element and a charge-to-digital converter, wherein the capacitor experiences a charge difference due to the change in voltage across the element induced by the two states of the input current;
converting, by the charge-to-digital converter, the charge difference to a digital value indicative of the temperature of the element;
wherein said converting the charge difference to the digital value comprises:
converting, by a charge-to-voltage converter, the charge to a voltage; and
converting, by a voltage-to-digital converter, the voltage to the digital value;
forcing a two-state direct current (DC)-shifting current that has opposite polarity of the two-state input current into a pull-down resistor whose voltage varies with the two-states of the DC-shifting current;
using a second capacitor to maintain a continuous connection between the pull- down resistor and the charge-to-digital converter; and
operating the DC-shifting current, pull-down resistor and second capacitor to shift down a DC operating point of the charge-to-voltage converter to increase a dynamic range of the charge-to-voltage converter.

21. A non-transitory computer-readable medium having instructions stored thereon that are capable of causing or configuring a temperature sensor to perform operations comprising:
forcing a two-state input current into an element whose temperature is sensed based on a change in voltage across the element induced by the two states of the input current;
using a capacitor to maintain a continuous connection between the element and a charge-to-digital converter, wherein the capacitor experiences a charge difference due to the change in voltage across the element induced by the two states of the input current;
converting, by the charge-to-digital converter, the charge difference to a digital value indicative of the temperature of the element;

wherein said converting the charge difference to the digital value comprises:
  converting, by a charge-to-voltage converter, the charge to a voltage; and
  converting, by a voltage-to-digital converter, the voltage to the digital value;
forcing a two-state direct current (DC)-shifting current that has opposite polarity of the two-state input current into a pull-down resistor whose voltage varies with the two-states of the DC-shifting current;
using a second capacitor to maintain a continuous connection between the pull-down resistor and the charge-to-digital converter; and
operating the DC-shifting current, pull-down resistor and second capacitor to shift down a DC operating point of the charge-to-voltage converter to increase a dynamic range of the charge-to-voltage converter.

* * * * *

UNITED STATES PATENT AND TRADEMARK OFFICE
CERTIFICATE OF CORRECTION

PATENT NO. : 11,237,065 B2  
APPLICATION NO. : 16/385616  
DATED : February 1, 2022  
INVENTOR(S) : Zanbaghi et al.

Page 1 of 1

It is certified that error appears in the above-identified patent and that said Letters Patent is hereby corrected as shown below:

In the Claims

In Column 8, Line 38, in Claim 8, delete "element; and" and insert -- element; --, therefor.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*